(12) United States Patent
Saund

(10) Patent No.: US 9,053,579 B2
(45) Date of Patent: Jun. 9, 2015

(54) SELECTIVE LEARNING FOR GROWING A GRAPH LATTICE

(75) Inventor: Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 114 days.

(21) Appl. No.: 13/527,071

(22) Filed: Jun. 19, 2012

(65) Prior Publication Data

US 2013/0335422 A1      Dec. 19, 2013

(51) Int. Cl.
*G06K 9/00* (2006.01)
*G06T 11/20* (2006.01)

(52) U.S. Cl.
CPC .............. *G06T 11/206* (2013.01); *G06K 9/00* (2013.01)

(58) Field of Classification Search
CPC ............ G06K 9/00449; G06K 9/6892; G06K 9/6218; G06K 9/6277; G06K 9/0012; G06K 9/2054; G06K 9/6224; G06T 11/206; G06T 2207/20072; G10L 15/142; G06F 17/30958
USPC ......... 382/124, 155, 159, 225, 116, 187, 195, 382/217; 706/11, 20, 21, 55
See application file for complete search history.

(56) References Cited

U.S. PATENT DOCUMENTS

| | | | |
|---|---|---|---|
| 6,061,652 A * | 5/2000 | Tsuboka et al. | 704/245 |
| 6,072,891 A * | 6/2000 | Hamid et al. | 382/116 |
| 6,128,606 A * | 10/2000 | Bengio et al. | 706/10 |
| 6,556,983 B1 * | 4/2003 | Altschuler et al. | 706/55 |
| 7,099,505 B2 | 8/2006 | Li et al. | |
| 8,073,808 B2 * | 12/2011 | Rose | 706/62 |
| 2006/0182317 A1 * | 8/2006 | Neumann et al. | 382/124 |
| 2008/0218519 A1 * | 9/2008 | Coury et al. | 345/440 |
| 2008/0260257 A1 * | 10/2008 | Rose | 382/195 |
| 2009/0208112 A1 * | 8/2009 | Hamamura et al. | 382/195 |
| 2009/0324100 A1 * | 12/2009 | Kletter et al. | 382/217 |
| 2012/0047180 A1 | 2/2012 | Kirshenbaum | |
| 2012/0069024 A1 * | 3/2012 | Saund | 345/440 |
| 2012/0070091 A1 * | 3/2012 | Saund | 382/225 |

OTHER PUBLICATIONS

Messmer, B.T., et al. "A new algorithm for error-tolerant subgraph isomorphosm detection," IEEE Transactions on Pattern Analysis and Machine Intelligence, vol. 20, No. 5, pp. 493-504, 1998.

(Continued)

*Primary Examiner* — Barry Drennan
*Assistant Examiner* — Aklilu Woldemariam
(74) *Attorney, Agent, or Firm* — Fay Sharpe LLP

(57) ABSTRACT

A system and method generate a graph lattice from exemplary images. At least one processor receives exemplary data graphs of the exemplary images and generates graph lattice nodes of size one from primitives. Until a termination condition is met, the at least one processor repeatedly: 1) generates candidate graph lattice nodes from accepted graph lattice nodes; 2) selects one or more candidate graph lattice nodes preferentially discriminating exemplary data graphs which are less discriminable than other exemplary data graphs using the accepted graph lattice nodes; and 3) promotes the selected graph lattice nodes to accepted status. The graph lattice is formed from the accepted graph lattice nodes and relations between the accepted graph lattice nodes.

17 Claims, 12 Drawing Sheets

(56) References Cited

OTHER PUBLICATIONS

Shervashidz, N., et al., "Efficient graphlet kernels for large graph comparison," in 12th International Conference on Artificial Intelligence and Statistics (AISTATS). Society for Artificial Intelligence and Statistics, 2009, pp. 488-495.

Sidere, N., et al., "Vector representation of graphs: Application to the classification of symbols and letters," in Proc. 10th International Conference on Document Analysis and Recognition (ICDAR 2009). IEEE Computer Society, 2009, pp. 681-685.

* cited by examiner

SELECTIVE LEARNING FOR GROWING A GRAPH LATTICE

BACKGROUND

The present exemplary embodiments relate generally to computer vision. They find particular application in conjunction with computer vision applications, such as image classification, image clustering, image retrieval, and repeated structure finding, and will be described with particular reference thereto. However, it is to be appreciated that the present exemplary embodiments are also amenable to other like applications.

Bag-of-words approaches for computer vision applications are common place. Under such approaches, objects and scenes are modeled as large vectors of feature measurements. Typically, the features are purely appearance-based measuring, for example, local shape and texture properties. However, these features may not be very descriptive and/or discriminative. Hence, a recent trend is to use spatial relationships as features.

One approach for encoding spatial relationships is through graphs. Objects and scenes are modeled as parts (i.e., nodes), such as junctions, and relations (i.e., links) between the parts. Subgraph matching is then employed to find part instances in graph representations of image data.

Subgraph matching poses certain difficulties. Without the use of attributed graphs, subgraph matching is exponentially expensive. An attributed graph is a graph with nodes containing properties that constrain possible matches. However, noise and variability cause observed subgraphs to deviate from ideal models. This demands the use of inexact graph matching techniques, which increase matching costs and largely remove the advantages of attributed graph matching.

In view of the foregoing, it would be advantageous to have methods and/or systems that perform attributed graph matching for large collections of related subgraphs for the purpose of classifying input data in graphical form. The disclosure hereafter contemplates such methods and/or systems.

INCORPORATION BY REFERENCE

U.S. patent application Ser. No. 12/883,503 (U.S. Patent Application Publication No. 2012/0070091) for GRAPH LATTICE METHOD FOR IMAGE CLUSTERING, CLASSIFICATION, AND REPEATED STRUCTURE FINDING, by Eric Saund, filed Sep. 16, 2010, U.S. patent application Ser. No. 12/883,464 (U.S. Patent Publication No. 2012/0069024) for METHOD FOR GENERATING A GRAPH LATTICE FROM A CORPUS OF ONE OR MORE DATA GRAPHS, by Eric Saund, filed on Sep. 16, 2010, and U.S. patent application Ser. No. 13/527,032 for WEIGHTED FEATURE VOTING FOR CLASSIFICATION USING A GRAPH LATTICE, by Eric Saund, filed on even date herewith, are each hereby incorporated herein by reference in entirety.

BRIEF DESCRIPTION

According to one aspect of the present application, a system for generating a graph lattice from exemplary images is provided. The system includes at least one processor programmed to receive exemplary data graphs of the exemplary images. Nodes of the exemplary data graphs are formed from primitives. Further, graph lattice nodes of size one are generated from the primitives. Thereafter, until a termination condition is met, the at least one processor repeatedly: 1) generates candidate graph lattice nodes from accepted graph lattice nodes, including the graph lattice nodes of size one and promoted graph lattice nodes, and the exemplary data graphs; 2) selects one or more candidate graph lattice nodes, the selected candidate graph lattice nodes preferentially discriminating exemplary data graphs which are less discriminable than other exemplary data graphs using the accepted graph lattice nodes; and 3) promotes the selected graph lattice nodes to accepted status. The graph lattice is formed from the accepted graph lattice nodes and relations between the accepted graph lattice nodes.

According to another aspect of the present application, a method for generating a graph lattice from exemplary images is provided. The method is performed by at least one processor and includes receiving exemplary data graphs of the exemplary images. Nodes of the exemplary data graphs are formed from primitives. Further, graph lattice nodes of size one are generated from the primitives. Thereafter, until a termination condition is met, the at least one processor repeatedly: 1) generates candidate graph lattice nodes from accepted graph lattice nodes, including the graph lattice nodes of size one and promoted graph lattice nodes, and the exemplary data graphs; 2) selects one or more candidate graph lattice nodes, the selected candidate graph lattice nodes preferentially discriminating exemplary data graphs which are less discriminable than other exemplary data graphs using the accepted graph lattice nodes; and 3) promotes the selected graph lattice nodes to accepted status. The graph lattice is formed from the accepted graph lattice nodes and relations between the accepted graph lattice nodes.

According to another aspect of the present application, a system for generating a graph lattice from exemplary images is provided. The system includes at least one processor programmed to receive exemplary data graphs of the exemplary images. Nodes of the exemplary data graphs are formed from primitives. Further, graph lattice nodes of size one are generated from the primitives. Thereafter, until a termination condition is met, the at least one processor repeatedly: 1) generates candidate graph lattice nodes from accepted graph lattice nodes, including the graph lattice nodes of size one and promoted graph lattice nodes, and the exemplary data graphs, each graph lattice node, including the accepted graph lattice nodes and the candidate graph lattice nodes, includes a subgraph, a vote weight, and at least one mapping of the subgraph to the exemplary data graphs; 2) scores each candidate graph lattice node according to a scoring function, the scoring function including a ratio, wherein a numerator of the ratio is based on the vote weight of the candidate graph lattice node, and wherein a denominator of the ratio is a summation of vote weights of accepted graph lattice nodes mapping to exemplary data graphs the candidate graph lattice node maps to; 3) selects most highly scored candidate graph lattice nodes according to selection criteria; and 4) promotes the selected graph lattice nodes to accepted status. The graph lattice is formed from the accepted graph lattice nodes and relations between the accepted graph lattice nodes.

DETAILED DESCRIPTION

Large families of complex features, in the form of subgraphs, can be built out of simpler subgraphs through construction of a graph lattice. A graph lattice is a hierarchy of related subgraphs linked in a lattice. By supporting large numbers of subgraphs, image structure can be captured. Further, exact graph matching can be performed notwithstanding image noise and variability. Hence, a graph lattice advantageously facilitates computer vision applications such as image classification, image clustering, image retrieval, and repeated structure finding.

1.0 Overview of a Graph Lattice

The basic framework, called "graph lattice", is a lattice of nodes, where each node corresponds to a subgraph representing image primitives and relations. The graph lattice nodes are related to each other in a lattice by adding primitives upward and removing primitives downward. For example, assuming the lattice extends from size 1 to size N, where primitives define size 1, all the subgraphs of size i>1 are comprised of a subgraph of size i−1 plus a primitive.

The framework is illustrated in the domain of rectilinear line art. Rectilinear line art can be easily represented as graphs. Rule lines in the domain of rectilinear line art intersect in well-defined ways forming junctions and free-end terminators. These junctions are well suited for use as nodes of a graph, and rule line segments linking junctions are well suited for use as links of the graph. Further, rectilinear line art is common in forms to which computer vision is commonly applied.

Figure 1:
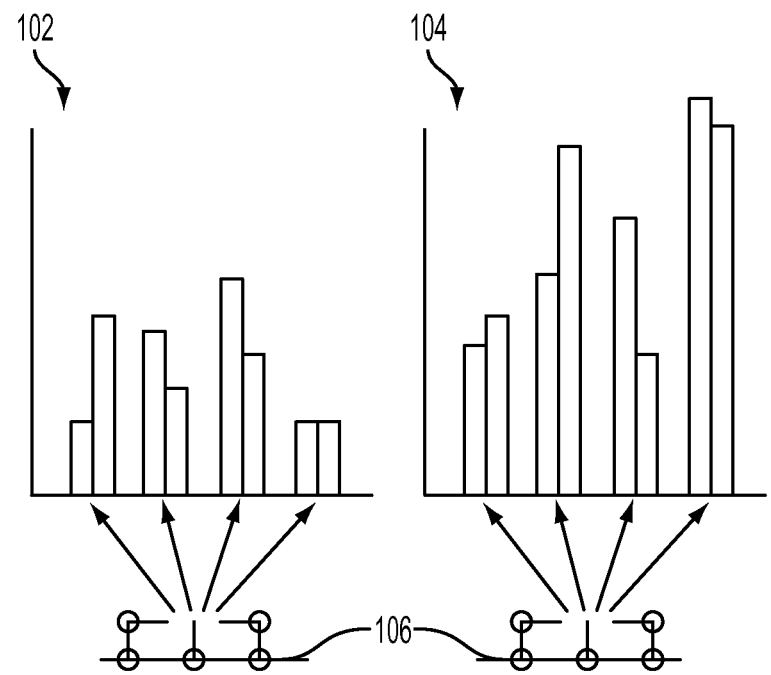
FIG. 1 illustrates examples of rectilinear line art and some of the repeating structure found within these examples.

FIG. 1 shows examples of rectilinear line art and some of the repeating substructure found within these examples. As can be seen, a first image 102 and a second image 104 each include a bar chart. Further, within these images 102, 104, there is repeating substructure, such as substructure 106. Substructure can repeat within a single image and/or across multiple images, and a graph lattice enables the discovery and use of substructure.

Figure 2:
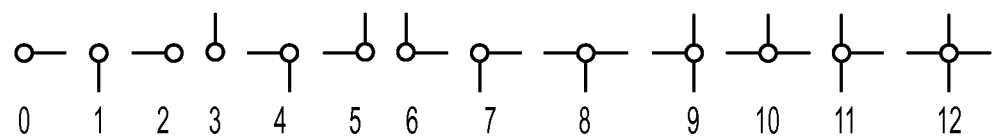
FIG. 2 illustrates that there are thirteen types of junctions (i.e., primitives) in the domain of rectilinear line art.
Figure 3:
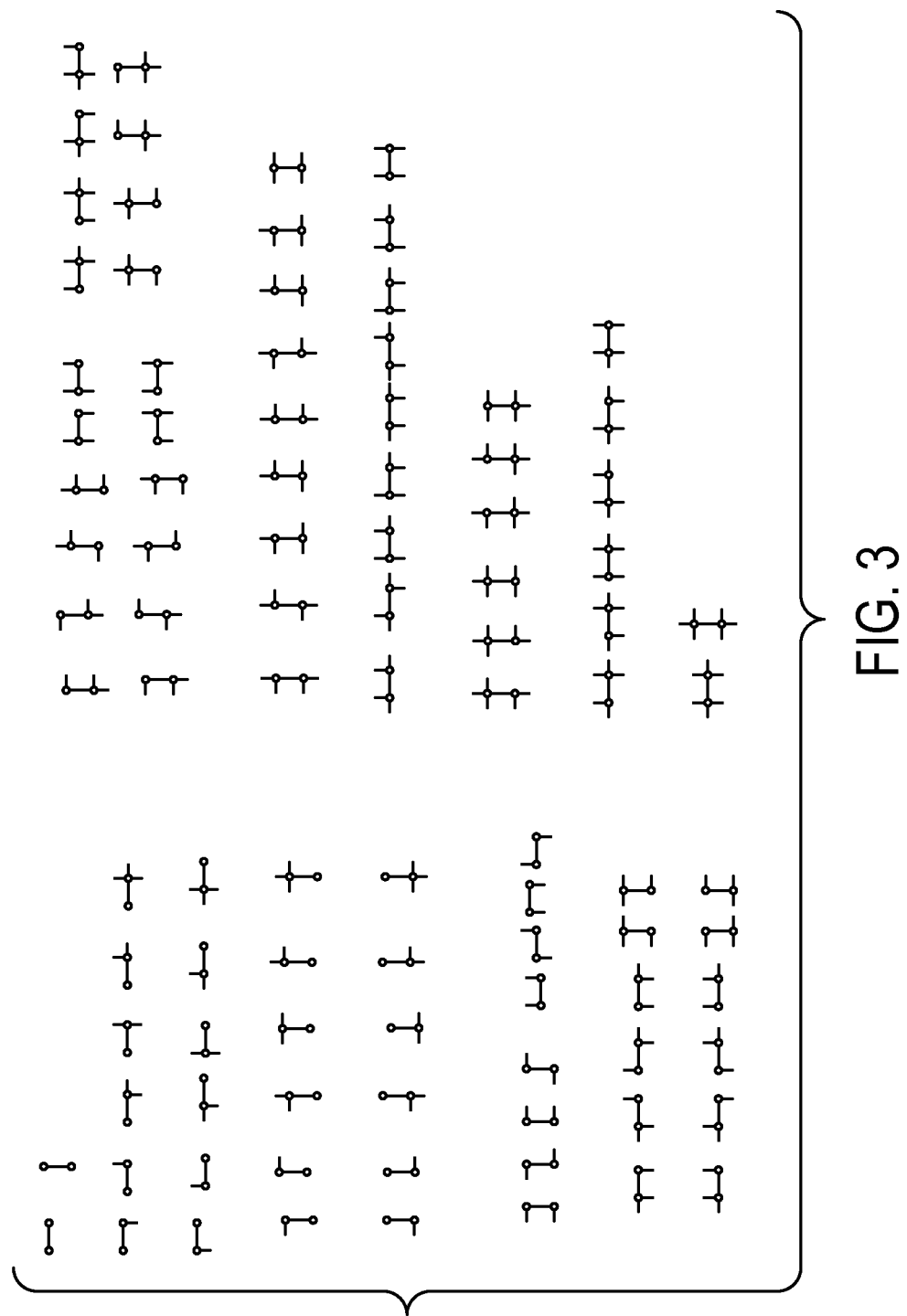
FIG. 3 illustrates that there are 98 possible pairings of primitives.

FIG. 2 defines thirteen types of junctions in the domain of rectilinear line art. These are the primitives, or first level subgraphs, of a graph lattice. The thirteen primitive junction types can be grouped according to their compatible link directions in much the same way atoms combine to form molecules. FIG. 3 shows that there are ninety-eight (98) possible pairings of these primitives. In other words, there are ninety-eight (98) subgraphs of size 2.

Figure 4:
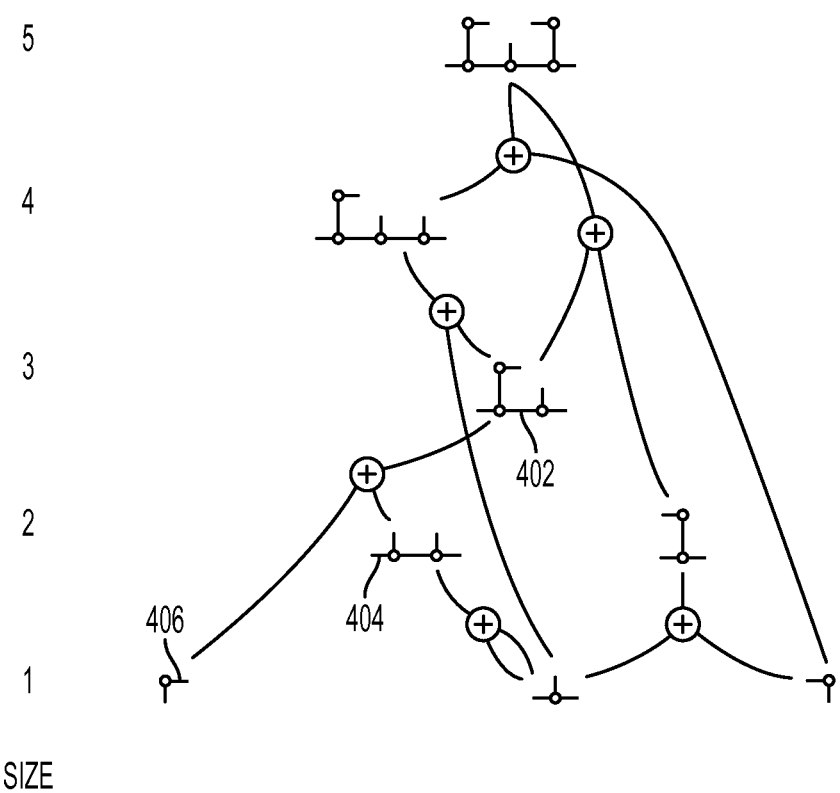
FIG. 4 illustrates parent-child relations that define a graph lattice.

Parent-child relations between subgraphs form a lattice. As a matter of terminology, smaller subgraphs are termed parent nodes and larger subgraphs generated from smaller subgraphs by adding primitives are termed child nodes. FIG. 4 illustrates this concept. Therein, with exception to the primitives, each subgraph of size i is comprised of a subgraph of size i−1 and a primitive. For example, subgraph 402 of size 3 is comprised of subgraph 404 of size 2 and primitive 406 (i.e., a subgraph of size 1). Notwithstanding that the discussion herein assumes that child graph lattice nodes are always one size larger than their parents, in certain embodiments two subgraphs of arbitrary size may be conjoined to create a larger subgraph.

To build a fully populated graph lattice of size N, all thirteen primitives are appended onto all link-compatible locations of subgraphs of size i to define all the subgraphs of size i+1, where i extends from 1 to N−1. As should be appreciated, each level of the lattice acts as the base for the next layer. Further, building an entire graph lattice of size N provides an abstract representation for the space of all possible figures containing N junctions and all subgraphs of each figure. However, fully populating a graph lattice grows astronomically above size 3, whereby it is not practical to build a fully populated graph lattice above size 5 for many applications.

Consider now a graph lattice representing only a single figure and all of its subgraphs, where the figure contains N junctions. This figure will define a single node in the graph lattice at size N. Then at size N−1 the figure will have N−1 nodes, each of which is a subgraph with one of its junctions missing. The number of nodes at size N−2 will depend on the figure's topology. Thus, the graph lattice forms a diamond shape with a flattened base, where the base is comprised of thirteen nodes representing the primitives. The diamond will typically be widest at layers around N/2, where most combinations of present and missing junctions tend to occur. Thus, the total number of nodes in the complete graph lattice for a single figure is on the order of $2^N$.

Notwithstanding that the concept of a graph lattice was introduced in the context of rectilinear line art, it is to be appreciated that other formulations are equally amenable. Namely, it is to be understood that the concepts of graph lattice are more broadly applicable to any subject matter capable of representation by a set of primitives.

2.0 Building a Graph Lattice

After introducing some basic concepts involved with the generation of a graph lattice, an algorithm for building a graph lattice is introduced. Briefly, the algorithm manages the complexity of a graph lattice by only building the portion of the entire theoretical graph lattice that is meaningful and useful for a given data corpus. A data corpus is a collection of data graphs, where each data graph corresponds to an image, such as an image of a form. A data graph represents an image using primitives, discussed above, where nodes in the data graph correspond to primitives and edges in the data graph correspond to links between the primitives. In the case of rectilinear line art, a data graph of an image is constructed by extracting the rule lines to determine the junctions formed by the rule lines. These junctions then define nodes of the data graph, which are interconnected according to the rule lines.

Figure 5:
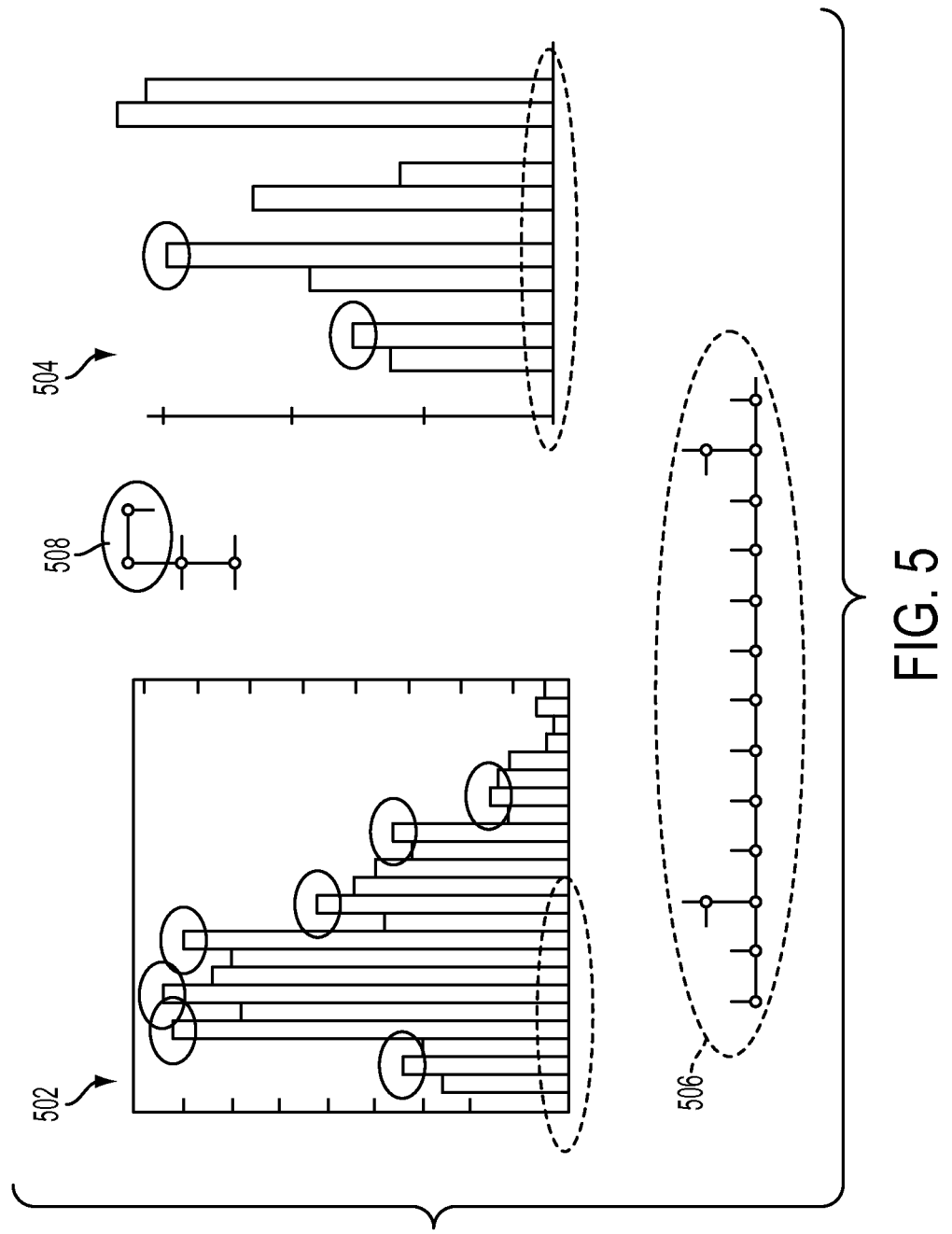
FIG. 5 illustrates two images that can be used to build a graph lattice.

FIG. 5 is illustrative in explaining how to build a graph lattice for the data graphs of two images 502, 504. Suppose the data graph of each image is comprised of N junctions. As noted above, if N>5, it is generally impractical to build a fully populated graph lattice. Thus, to address this problem, the graph lattice is only populated with subgraphs found in the data graphs of the two images 502, 504, such as subgraphs 506, 508.

2.1 Struts

A graph lattice node at a lower level (i.e., size) may be a subgraph of a graph lattice node at a higher level. Parent-child relations are typically maintained in triples. A triple consists of a node at level N (i.e., the parent), a primitive and technically a second parent, and a node at level N+1. The node at level N+1 is the subgraph consisting of the subgraph of the parent graph lattice node and the primitive linked to the perimeter (i.e., the child) of the subgraph of the parent graph lattice node.

Triples are typically maintained in a data structure called a strut. A strut maintains the junction index mapping between a parent and child graph lattice node. In general, any graph lattice node will index its component junctions in arbitrary order, and a strut keeps those organized between parent and child graph lattice nodes. Further, a strut indicates the primitive type, placement on the parent, and links for the junction that constructs the child from the parent.

Figure 6:
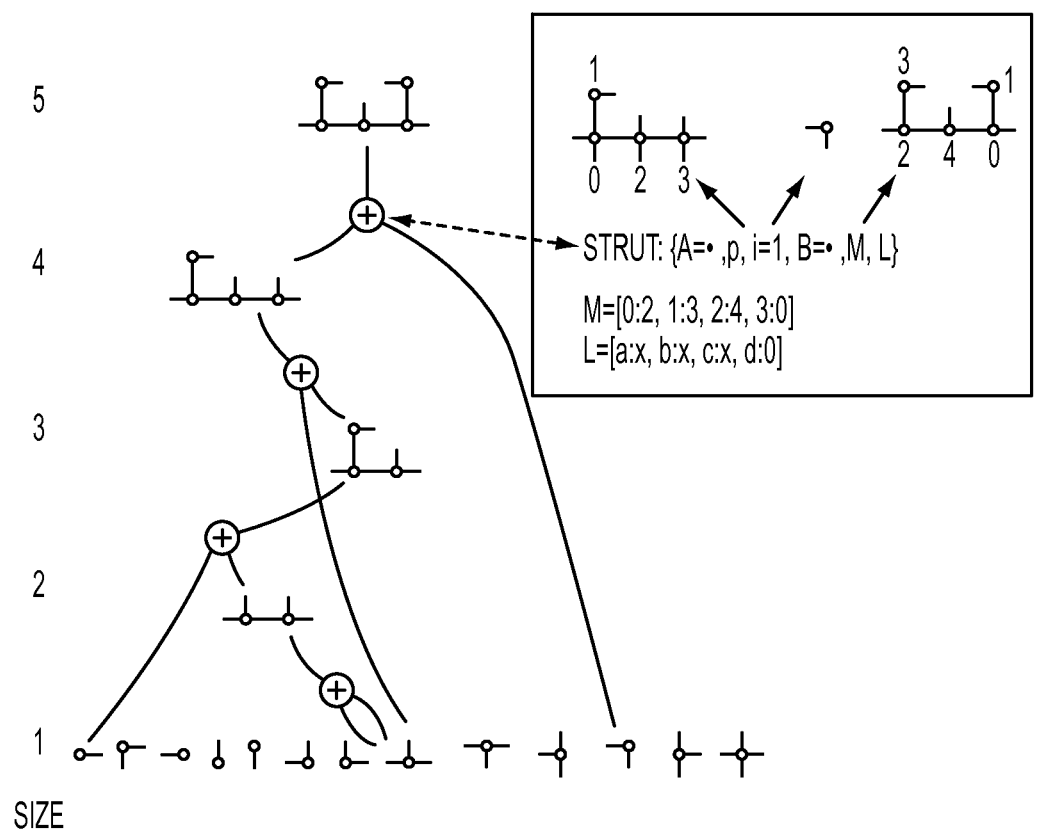
FIG. 6 illustrates the concept of a strut.

Referring to FIG. 6, the concept of a strut is illustrated. A strut maintains pointers to its constituent graph lattice nodes. A strut is denoted as S{A,p,i,B,M,L}, where A is the parent graph lattice node; p is the type of the primitive added to the parent to create the child; i is the index of this primitive in the child subgraph; B is the child subgraph (i.e., graph lattice node); M is the mapping between parent junction indices and child junction indices; and L is the linkage of the primitive into the parent to create the child subgraph. L maps from direction indices on the added primitive to node indices of the child.

Graph lattice nodes typically maintain lists of struts they participate in. However, in certain embodiments, the primitives do not maintain these lists unless both parents are primitives and the child is a size 2 graph lattice node. Advantageously, this promotes economy.

2.2 Mappings

Figure 7:
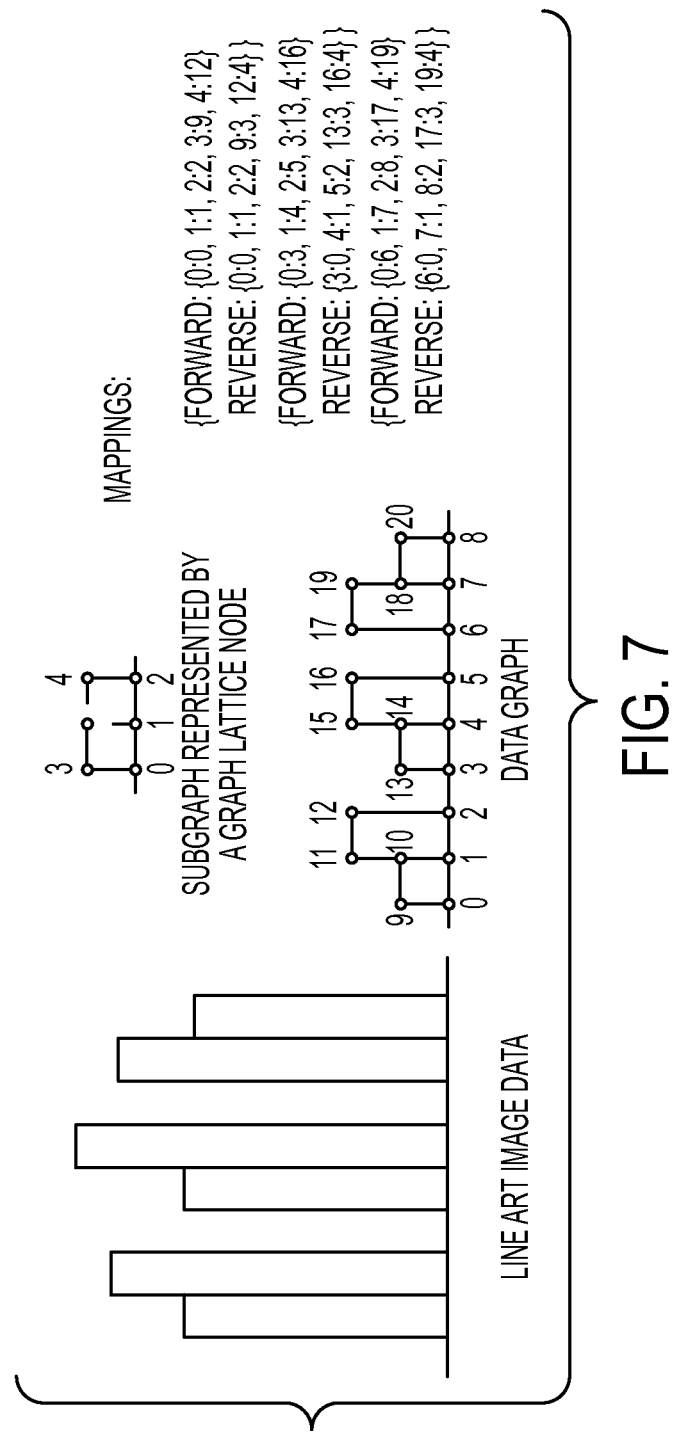
FIG. 7 illustrates mappings between an example data graph and a subgraph of a graph lattice node.

Each graph lattice node is itself a subgraph. As such, a node can be matched to an observed data graph by mapping the graph lattice node's subgraph junctions to corresponding data graph junctions. Because the primitives are typed, any well-known algorithm for attributed subgraph matching can perform this matching. FIG. 7 illustrates the resulting mappings between an example data graph and a graph lattice node's subgraph. In general such a mapping will be one-to-many (i.e., a single subgraph represented by a graph lattice node may map to multiple portions of an observed data graph).

To facilitate efficient construction of a graph lattice, mappings between graphic lattice nodes and observed data graphs can be maintained using a data structured called a MappingSet. In that regard, each graph lattice node includes a MappingSet for each data graph its subgraph maps to. The MappingSet(s) of a graph lattice node record the identities and locations on data graph(s) the graph lattice node's subgraph maps to.

A MappingSet consists of a triple: {graph lattice node, DataGraphID, list-of-Mappings}. A DataGraphID is a pointer to a data graph and its associated original image (e.g., a filename). A list-of-Mappings is a list of mappings, each of which is a pair: {forward-mapping-array, reverse-mapping-array}. A forward-mapping-array is an array having a size equal to the size of the graph lattice node. This array maps from node indices of the graph lattice node's subgraph onto indices of nodes in the data graph. A reverse-mapping-array is an array or hashtable that maps from node indices of the data graph to node indices of the subgraph represented at the graph lattice node. As the data graph will be very large, it is more space-efficient to store the reverse-mapping as a hashtable (with collision detection) instead of as an array having a length equal to the size of the data graph.

2.3 Accepted and Candidate Nodes

At any given time a list of Accepted graph lattice nodes and a list of Candidate graph lattice nodes are maintained. The purpose of these lists is described in more detail below, but, briefly, Accepted graph lattice nodes are nodes that have been added to the graph lattice and Candidate graph lattice nodes are nodes being considered for addition to the graph lattice. As a starting condition, a list of primitives is used for the Accepted graph lattice nodes and an empty set is used for the initial Candidate graph lattice nodes.

Further, the sets of Candidate and Accepted graph lattice nodes are each maintained in a data structure consisting of an array indexed by size (number of primitives). Each element of this array consists of a hashtable indexed by the combinations of numbers of primitives. For example, a hash index may be computed using the Java hashing function on a string concatenated from digits counting the number of matches of each primitive to a data graph. The purpose of this data structure is to make it efficient to detect duplicate graph lattice nodes.

In certain embodiments, each Accepted and Candidate graph lattice node maintains a count of the number of primitives it is built from so as to more efficiently facilitate indexing by size. As should be appreciated, the count of a graph lattice node's primitives corresponds to the size, or level, of the graph lattice node.

2.4 Algorithm

Figure 8:
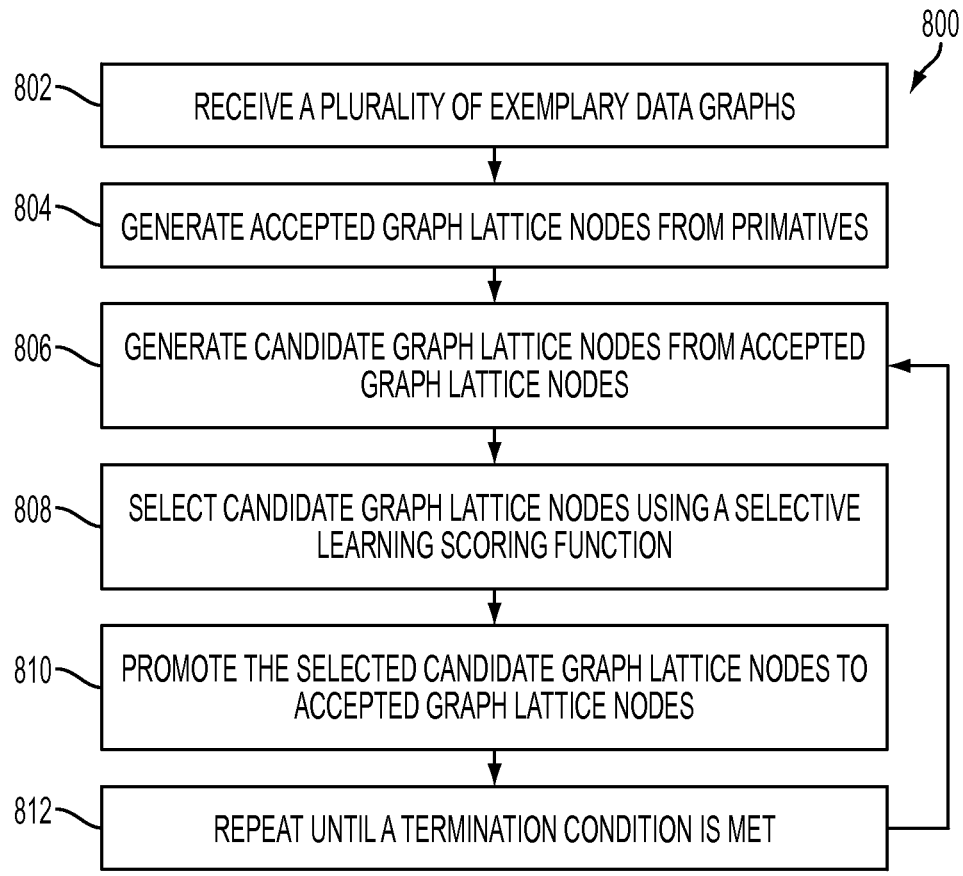
FIG. 8 illustrates an algorithm for generating a graph lattice.

A basic algorithm 800 for generating a graph lattice is shown in FIG. 8. The algorithm 800 receives a plurality of data exemplars (Action 802), each of which is a data graph consisting of nodes representing primitive elements and links representing relations among primitive elements. These exemplars allow the graph lattice to be narrowly tailored for the use at hand by only generating subgraphs that can be mapped to the data exemplars. As noted above, this is important because it is not practical to build a fully populated graph lattice above size 5.

Further, in addition receiving the exemplary data graphs, Accepted graph nodes of size 1 are generated from primitives found within the exemplary data graphs (Action 804). In that regard, the mappings between the primitives and the exemplary data graphs are determined and stored typically using MappingSet(s).

Next, Candidate graph lattice nodes are generated from the Accepted graph lattice nodes and the exemplary data graphs (Action 806). This includes generating extensions of the subgraphs of the Accepted graph lattice nodes, typically exhaustively for each of the Accepted graph lattice nodes. An extension of a subgraph of a graph lattice node is a supergraph comprised of the subgraph and a primitive linked to the perimeter of the subgraph, where the supergraph maps to the exemplary data graphs. Extensions of a subgraph of a graph lattice node can be determined by, for each of for each of the exemplary data graphs the subgraph maps to, analyzing the mapping(s) of the subgraph onto the data graph. For each mapping of the subgraph onto the data graph, supergraphs of one size higher than the subgraph and which extend from the mapping are determined.

Figure 9:
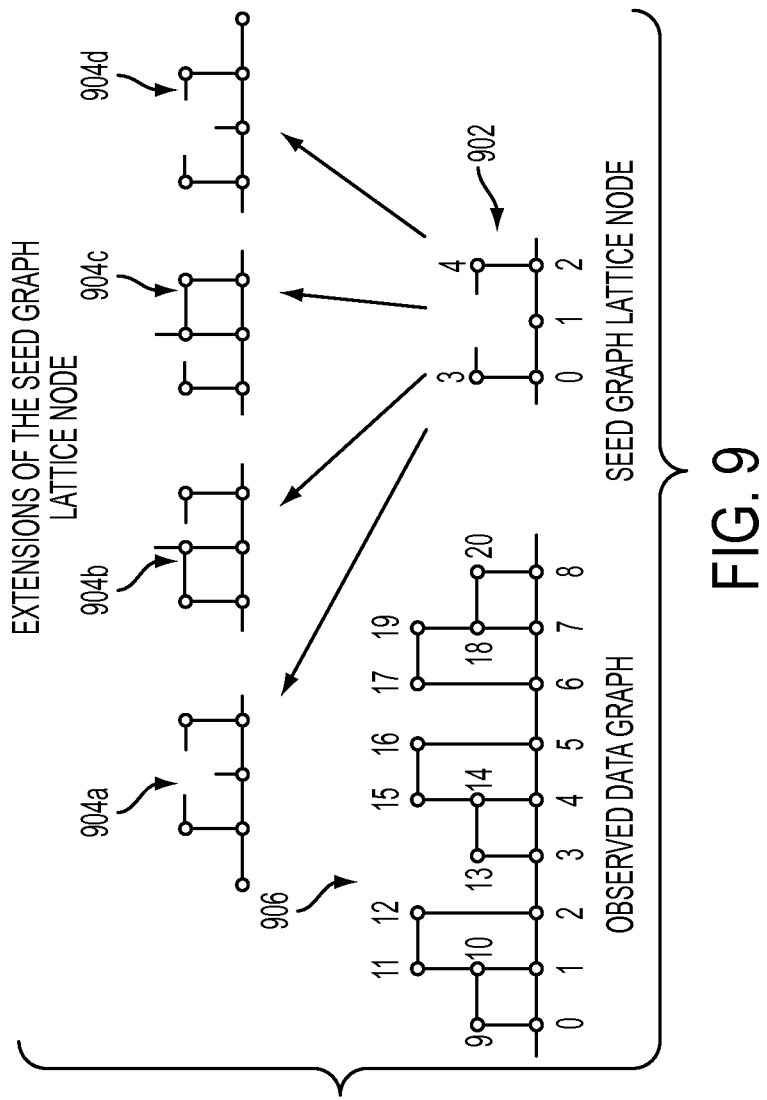
FIG. 9 illustrates the concept of an extension.

Referring to FIG. 9, the concept of an extension is illustrated. Therein, a seed graph lattice node 902 is used to spawn four extensions 904a-904d. For this example, it is to be understood, each extension is of size 6, which is one size higher than the seed graph lattice node. Further, each extension is found within an exemplary data graph 906.

Before being added as a new Candidate graph lattice node, each extension of size N+1 is compared with the existing graph lattice at level N+1 to make sure it does not duplicate an existing subgraph of an Accepted or Candidate graph lattice node. This duplication check is facilitated by the hashtable indexing of graph lattice nodes described above. Through the hashtable, the set of possibly identical level N+1 graph lattice nodes that have to be compared by actual graph matching is narrowed down to only a small number of graph lattice nodes.

If an extension isn't found, a Candidate graph lattice node for the extension is added to the list and hashtable of Candidate graph lattice nodes at level N+1. Further, the Candidate graph lattice node is mapped to the exemplary data graphs, typically using MappingSet(s), and linked within the graph lattice, typically using struts. The strut linking this new Candidate graph lattice node of size N+1 with its level N parent and associated primitive is obvious. But because of the lattice nature of the graph lattice, other level N graph lattice nodes may also be subgraphs of the new extension. Struts for these relations must be formed as well. Even more, the Candidate graph lattice node is assigned a vote weight. The vote weight of a graph lattice node is typically 1/M, where M is the number of exemplary data graphs the subgraph of the graph lattice node maps to. The weight can be easily determined using the MappingSet(s) of the graph lattice node.

Referring back to FIG. 8, once the Candidate graph lattice nodes are generated (Action 806), some of the Candidate graph lattice nodes are selected for promotion to Accepted graph lattice nodes (Action 808). In general the goal is to grow the graph lattice so that the promoted nodes serve the target computer vision application, such as image classification.

One method for selecting Candidate graph lattice nodes is to rank order all Candidate graph lattice nodes according to a selective learning scoring function and select the highest scoring Candidate graph lattice nodes. As will be seen, the selective learning scoring function advantageously promotes Candidate graph lattice nodes in the graph lattice that contribute to the discrimination of the exemplary data graphs that need more discriminating features. It is to be appreciated, however, that other approaches to selecting Candidate graph lattice nodes are also possible.

The highest scoring candidate graph lattice nodes can include, for example, one or more of: 1) the graph lattice nodes having a score exceeding a predetermined value; 2) the graph lattice nodes within a top predetermined percentile; and 3) a predetermined number of the highest scoring graph lattice nodes. Further, the selection of highest scoring candidate graph lattice nodes can be performed within a ranking of all Candidate graph lattice nodes, or within each of a plurality of rankings of Candidate graph lattice nodes, the plurality of rankings including a ranking for each size of Candidate graph lattice node.

The selective learning scoring function is based on a ratio. The numerator is based on the vote weight of a Candidate graph lattice node to be scored, and the denominator is roughly the confusability of the exemplary data graphs (i.e., how easily they are confused with other exemplary data graphs) the Candidate graph lattice node's subgraph maps onto. The numerator can, for example, be the vote weight of the Candidate graph lattice node or a gated vote weight, discussed below.

In one embodiment, the score $c_s$ of a Candidate graph lattice node s can be determined according to the following scoring function $$c_s = \frac{\begin{cases} w_s : \{\exists\, m_1, m_2 : g_s \to m_1 \wedge g_s \to m_2\} \\ 0 : \text{otherwise} \end{cases}}{\sum_{m:g_s \to m} \sum_t \{w_t : g_t \to m\}} \quad (1)$$

where $g_s$ corresponds to the subgraph of the Candidate graph lattice node s, $w_s$ corresponds to the vote weight of the Candidate graph lattice node s, $m_1$ and $m_2$ corresponds to two different exemplary data graphs, $w_t$ corresponds to a vote weight of an Accepted graph lattice node t, $g_t$ corresponds to the subgraph of the Accepted graph lattice node t, and m corresponds to an exemplary data graph.

The numerator is a gated vote weight of the Candidate graph lattice node s. The gated vote weight is based on the number of exemplary data graphs the subgraph of the Candidate graph lattice node s maps to. Insofar as the subgraph of the Candidate graph lattice node s maps to at least a predetermined number of exemplary data graphs (typically two, as illustrated), the gated vote weight is the vote weight of the Candidate graph lattice node s. Otherwise, the gated vote weight of the Candidate graph lattice node s is zero. Advantageously, this filters out Candidate graph lattice nodes that map to random noise features.

The denominator is a sum over all the exemplary data graphs that map onto the subgraph of the Candidate graph lattice node s. For each such exemplary data graph, the vote weights of all Accepted graph lattice nodes that map to the exemplary data graph are summed. A high score typically means that this exemplary data graph is mapped to by many subgraphs of Accepted graph lattice nodes that are not mapped to many other exemplary data graphs, in which case there are many discriminating subgraph features for this exemplary data graph. On the other hand, a low score typically means that this exemplary data graph is not mapped to by unique or highly discriminative features, so it is more confusable with other exemplary data graphs.

Candidate graph lattice nodes previously selected (Action 808) are next promoted to Accepted graph lattice nodes (Action 810). By virtue of attaining Accepted status, a graph lattice node is eligible to serve as a seed for new Candidate graph lattice nodes.

After the Candidate graph lattice nodes are promoted (Action 810), the algorithm 800 repeats from the generated Candidate graph lattice nodes until a termination condition is met (Action 812). As should be appreciated, repetition is trivial. Namely, Candidate graph lattice nodes typically need only be generated from the newly Accepted graph lattice nodes. Further, a newly Accepted graph lattice node already refers to mappings to the exemplary data graphs. These mappings are easily followed to search for new Candidate graph lattice nodes.

Possible termination conditions include one or more of:
(i) the graph lattice containing a threshold number of Accepted graph lattice nodes at a given level;
(ii) the graph lattice containing a threshold number of Accepted graph lattice nodes in total;
(iii) the list of Candidate graph lattice nodes being exhausted;
(iv) quality measures for Candidate graph lattice nodes fall below a threshold; and,
(v) the runtime exceeding a predetermined period of time.
In certain embodiments, the termination condition is dependent on the approach to selection, discussed in Action 808.

Figure 10:
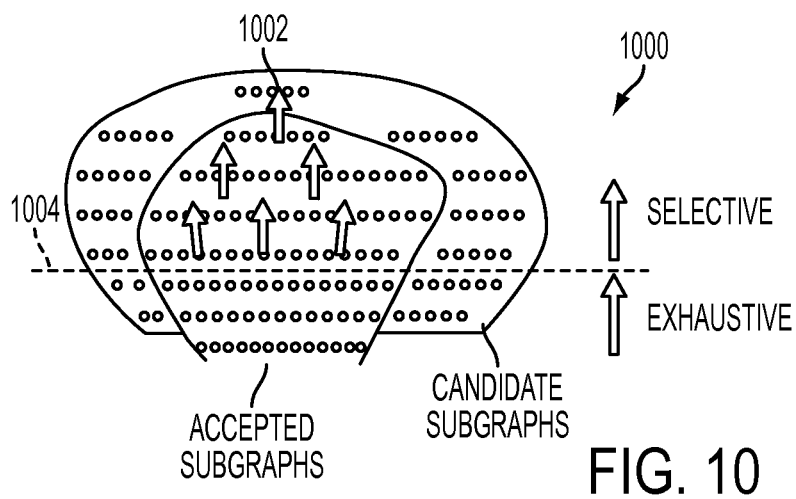
FIG. 10 illustrates the generation of a graph lattice.

With reference to FIG. 10, generation of a graph lattice 1000 is graphically illustrated. As shown by arrows, such as arrow 1002, graph lattice nodes of size N are employed to generate graph lattice nodes of size N+1. Further, as shown by dashed line 1004, above size 5, exhaustive generation of the graph lattice 1000 is not practical, whereby selective generation is required.

3.0 Matches to an Observed Data Graph

Because a graph lattice can be very large (containing thousands or hundreds of thousands of nodes), it is useful to compute the mappings of graph lattice nodes to observed data graphs efficiently. A naive approach is to perform subgraph matching independently between an observed data graph and each graph lattice node's subgraph. However, a more efficient algorithm that exploits the lattice structure in the relations among graph lattice nodes is discussed hereafter.

Figure 11:
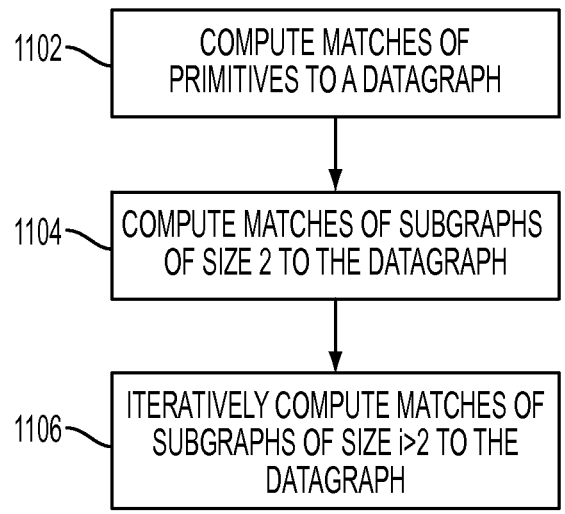
FIG. 11 illustrates an algorithm for computing mappings.

With reference to FIG. 11, an algorithm for computing mappings is illustrated. The algorithm takes as input a data graph and outputs a compilation of MappingSets describing all mappings from subgraphs represented by graph lattice nodes onto the data graph. The algorithm includes computing matches of primitives to nodes of the data graph (Action 1102), computing matches of subgraphs of size 2 to the data graph (Action 1104), and iteratively computing matches of subgraphs of size 3 and higher (Action 1106).

To begin, the subgraphs of size 1 are matched to the data graph (Action 1102). A subgraph can be matched to an observed data graph by mapping the graph lattice node's subgraph junctions to corresponding data graph junctions.

After the subgraphs of size 1 are matched (Action 1102), the subgraphs of size 2 are mapped to the data graph (Action 1104). For each pair of primitives A and B, a determination is made as to whether the pair of primitives A and B are parents of one or more struts to level 2 graph lattice nodes $C_1$, $C_2, \ldots, C_N$. If so, the algorithm iterates over all the mappings of A onto the data graph and determines whether $C_i$ is a valid mapping. The determination as to whether $C_i$ is a valid mapping is performed by testing the data graph for the existence of a link to primitive B in the correct proximity to A for that mapping.

Having mapped the subgraphs of size 2 to the data graphs (Action 1104), mappings at levels 3 and greater are iteratively computed, starting at level 3 graph lattice nodes. For each graph lattice node B at level N (starting with N=3), the algorithm selects one strut S to a parent node A at the previous level. It is only necessary to consider one strut because in order for a mapping at level N to be found, all of the node's subgraphs at level N-1 will be mapped. For the level N-1 parent node A associated with the strut S, the algorithm then iterates over each of its mappings onto the data graph, and, for each such mapping, examines whether the primitive p indicated by the strut S is also present on the data graph and linked as indicated by the strut's linkage parameter L. If this primitive is present and appropriately linked then the mapping to B can be established.

The complexity of this procedure grows linearly with the number of parent-child struts in the graph lattice and linearly with the number of mappings between graph lattice nodes and the data graph. The important point is that at each level, only a small amount of work is needed to compute mappings because all mappings are incremental extensions to mappings found at the previous level.

Figure 12:
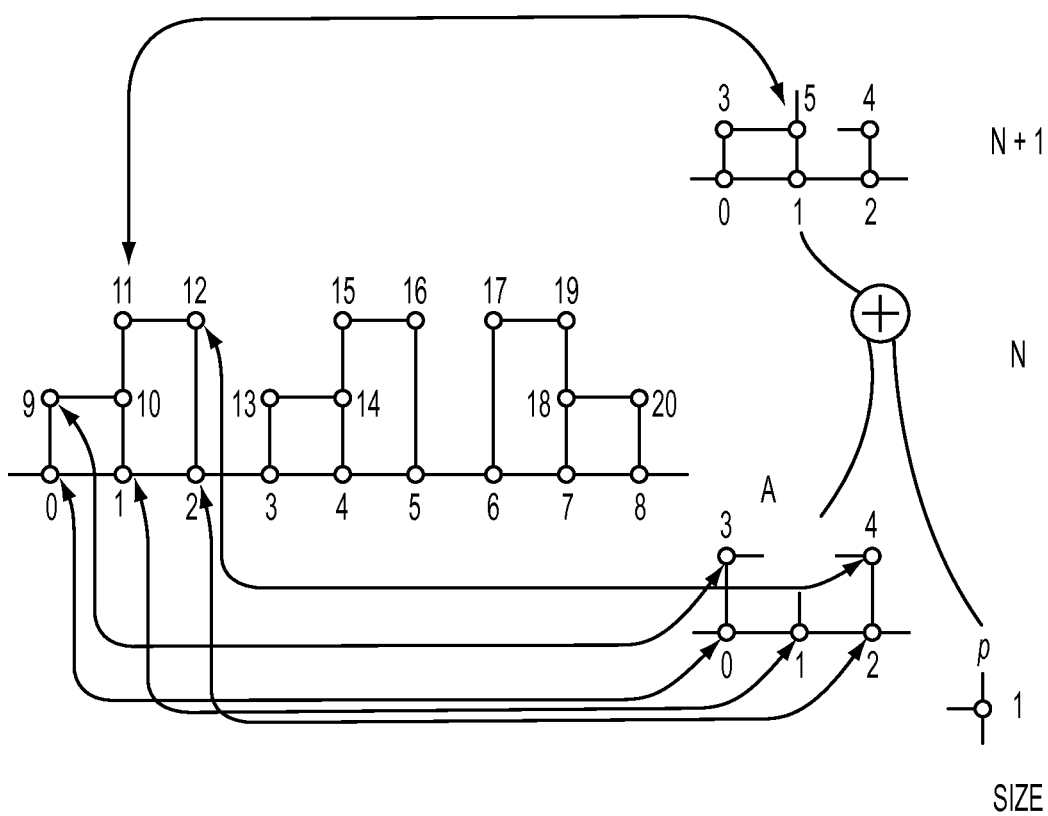
FIG. 12 illustrates a concept underlying the algorithm of FIG. 11.

Referring to FIG. 12, a concept underlying the matching algorithm is illustrated. Namely, the mapping of a graph lattice node B at level N+1 to a data graph is mostly inherited from the mapping of its parent graph lattice node A at level N to the data graph. The strut from A to B then indicates where on the data graph to test for the presence of the primitive p (index 5 on B). Thus, the matching algorithm undergoes an incremental mapping.

4.0 Applications

The graph lattice framework supports several important uses in computer vision applications, such as image classification, image clustering, image retrieval, and repeated structure finding. For a detailed discussion of these uses, attention is directed to U.S. patent application Ser. No. 12/883,503 (U.S. Patent Application Publication No. 2012/0070091) for GRAPH LATTICE METHOD FOR IMAGE CLUSTERING, CLASSIFICATION, AND REPEATED STRUCTURE FINDING, by Eric Saund, filed Sep. 16, 2010, incorporated herein by reference in its entirety. However, a graph lattice generated using the selective learning scoring function finds particular application in connection with image classification based on weighted feature voting, described below.

4.1 Image Classification

Figure 13:
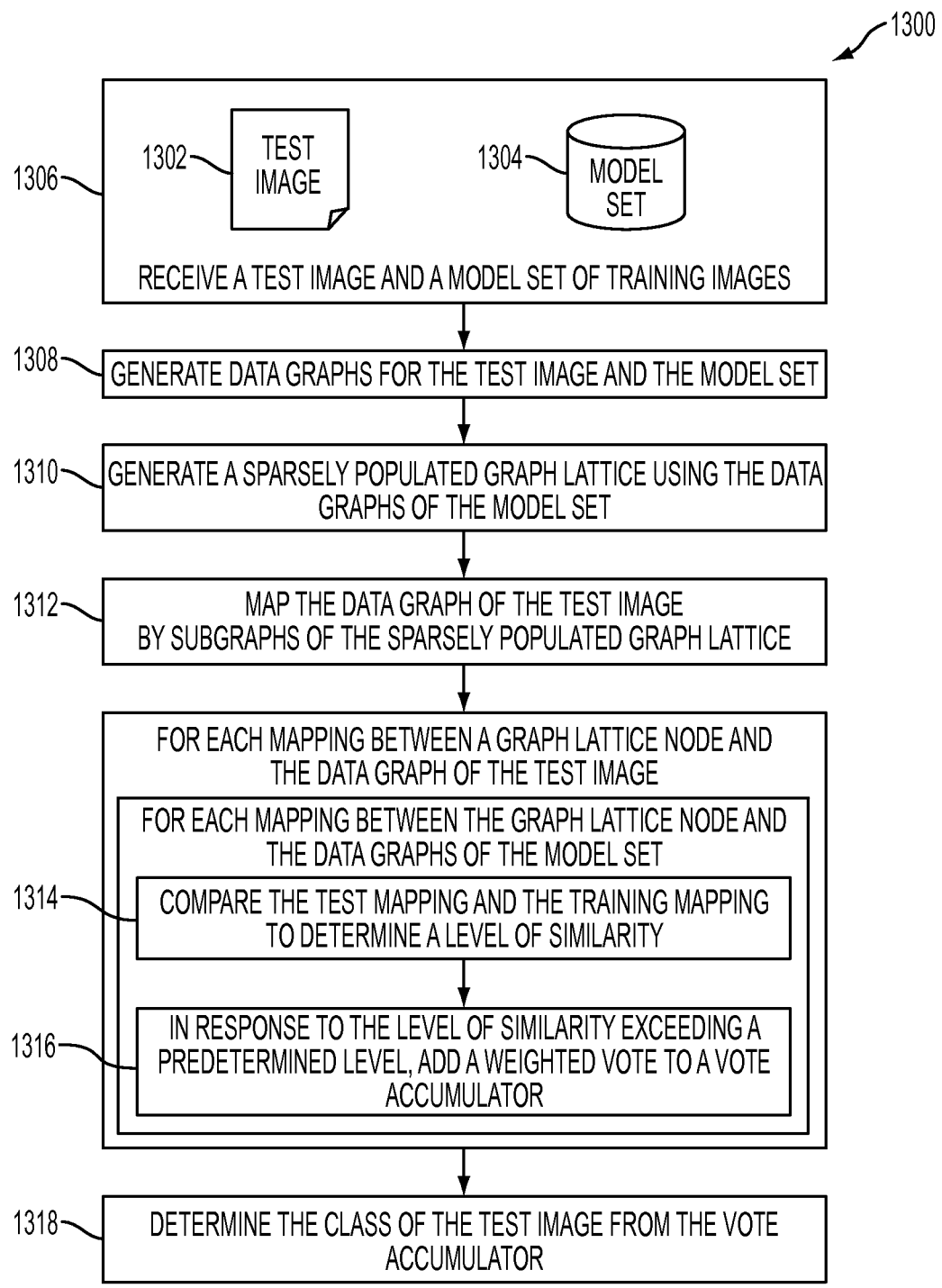
FIG. 13 illustrates an algorithm for classifying a test image.

An advantage of the graph lattice framework is that it allows efficient image classification. With reference to FIG. 13, an algorithm 1300 for classifying a test image 1302 is provided. For example, the test image 1302 can be an image of a United States tax form.

The algorithm 1300 includes receiving the test image 1302 and a model set 1304 of training images (Action 1306). The model set 1304 includes at least one training image exemplary of each of a plurality of classes, preferably including the class of the test image 1302. Data graphs are then generated for the test image 1302 and each of the training images (Action 1308). As discussed above, a data graph represents an image using primitives, where nodes in the data graph correspond to primitives and edges in the data graph correspond to links between the primitives.

Using the data graphs of the model set 1304, a sparsely populated graph lattice is generated (Action 1310), typically using the approach described in Section 2. This includes annotating each graph lattice node with its mapping(s) to the training data graphs and a vote weight. Typically, each mapping includes geometric information about the location and configuration of data graph junctions corresponding to the mapping. Such information can be captured using, for example, MappingSets, discussed above, or other data structures. Further, the vote weight of a graph lattice node is typically where M is the number of training data graphs the subgraph of the graph lattice node maps to. The weight can be easily determined since each subgraph includes mapping(s).

As should be appreciated, the sparsely populated graph lattice can be generated before classifying the test image 1302. Hence, in some embodiments, the algorithm 1300 receives the sparsely populated graph, as opposed to generating it.

Thereafter, the test data graph is mapped by subgraphs of the graph lattice (Action 1312), typically as described in Section 3. That is to say, mapping(s) to the test data graph are determined for each subgraph of the graph lattice found within the test data graph.

For each mapping between a graph lattice node and the test data graph, the mapping is compared against each mapping between the graph lattice node and the training data graphs to determine a level of similarity (Action 1314). Insofar as the level of similarity exceeds a predetermined level, a weighted vote is added to a vote accumulator array for the training data graph (Action 1316). The vote accumulator array is indexed based on training data graph, and the weighted vote is weighted based on the weight assigned to the graph lattice node.

In some embodiments, the comparison includes a geometric comparison to determine if the corresponding junctions of the test data graph and the training data graph mapped to by the graph lattice node are sufficiently aligned. This can include, for each of the subgraphs to be compared together, determining a centroid and a vector of relations between the centroid and the junctions of the subgraphs. Such relations can include, for example, the horizontal and/or vertical distances between the centroid and the junctions. The vectors can then be compared to determine a level of similarity. Insofar as the level of similarity exceeds a predetermined level, a weighted vote is added to a vote accumulator array for the training data graph.

Once all of the mappings between the graph lattice subgraphs and the test data graph are considered, the vote accumulator array holds the tally of weighted votes for all training data graphs. Using the vote accumulator array, the class of the training image 1302 is determined (Action 1318). The class of the training image 1302 is the class of the training data graph with the highest vote above a threshold number of votes, such as a predetermined number of votes. If no class receives a sufficient number of votes according to the threshold, then the class of the training image 1302 is unknown and the training image 1302 can be rejected.

Figure 14:
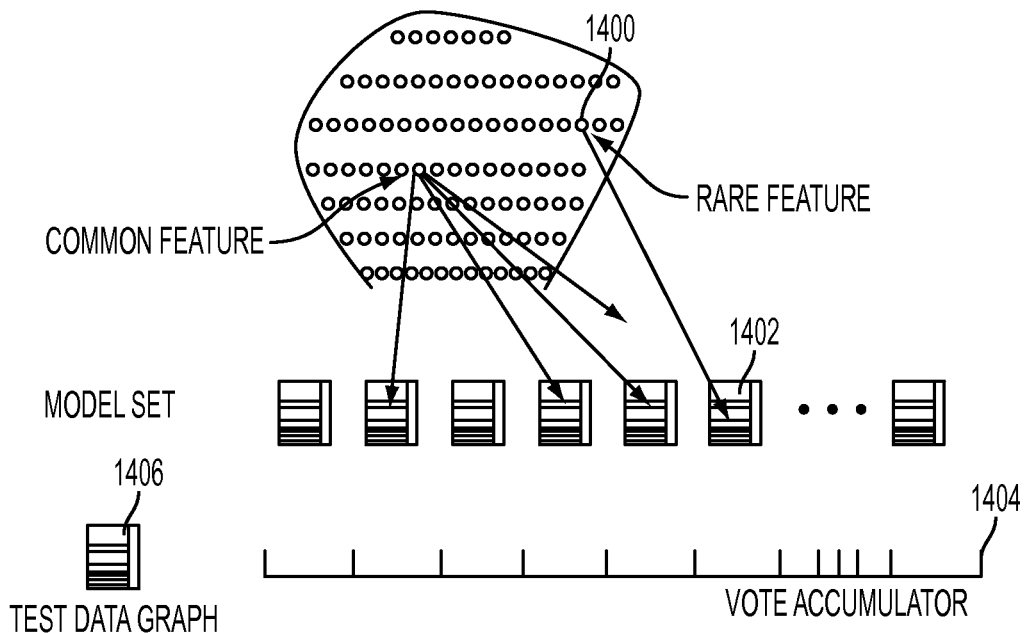
FIG. 14 illustrates a concept underlying the algorithm of FIG. 13.

Referring to FIG. 14, this approach to image classification is graphically illustrated. Therein, each node of a graph lattice, such as node 1400, is treated as a feature. Rare features, which only map to a small number of training data graphs, such as training data graph 1402, are weighted more heavily than common features, which map to a large number of training data graphs, since they are more discriminative and better for classification. Weighted votes are accumulated in a vote accumulator array 1404 by comparing mappings of the training data graphs with mappings of a test data graph 1406.

5.0 System Implementation

Figure 15:
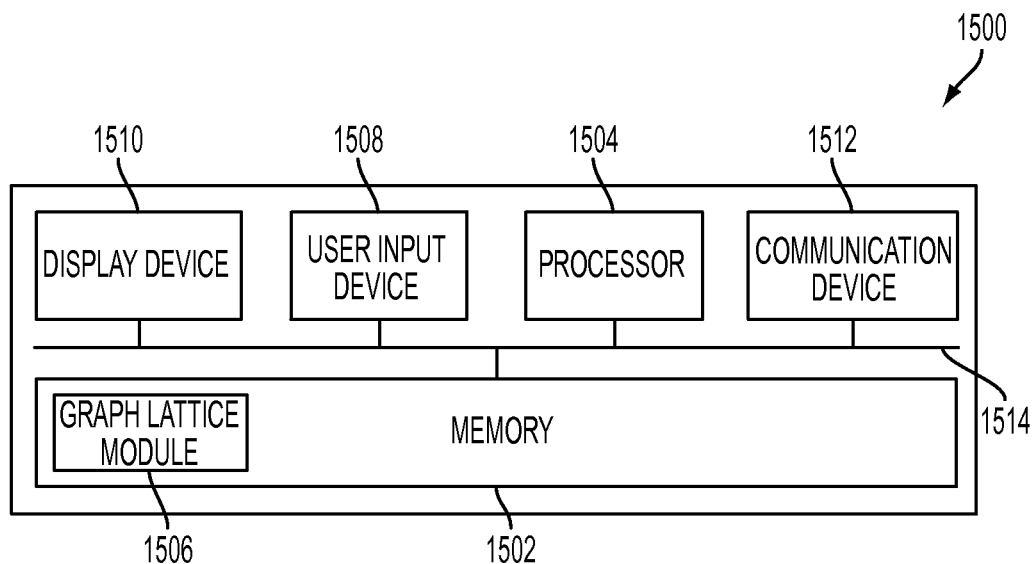
FIG. 15 illustrates a graph lattice system.

With reference to FIG. 15, a graph lattice system 1500 includes at least one memory 1502 and at least one processor 1504. The memory 1502 includes a graph lattice module 1506 comprised of processor executable instructions that generate a graph lattice according to the algorithm 800 of Section 2.4 and, typically, use the graph lattice for one or more computer vision applications, such as the computer vision applications described in Section 4.0. During use of the system 1500, the processor 1504 executes the processor executable instructions of the graph lattice module 1506 to generate the graph lattice and, typically, perform the one or more computer vision applications. In this way, the processor 1504 is programmed to generate the graph lattice module and, typically, perform the one or more computer vision applications.

The system 1500 can further include, or be operatively connected with, one or more user input devices 1508 for receiving user input to control the system 1500. Further, the system 1500 can further include, or be operatively connected with, one or more display devices 1510 for displaying output generated by the system 1500. An optional communication device 1512 allows the system 1500 to communicate with other systems, for example, over a communications network, such as the Internet, a local area network, a wide area network, and the like. At least one system bus 1514 of the system 1500 interconnects components thereof, such as the memory 1502 and the processor 1504.

Figure 16:
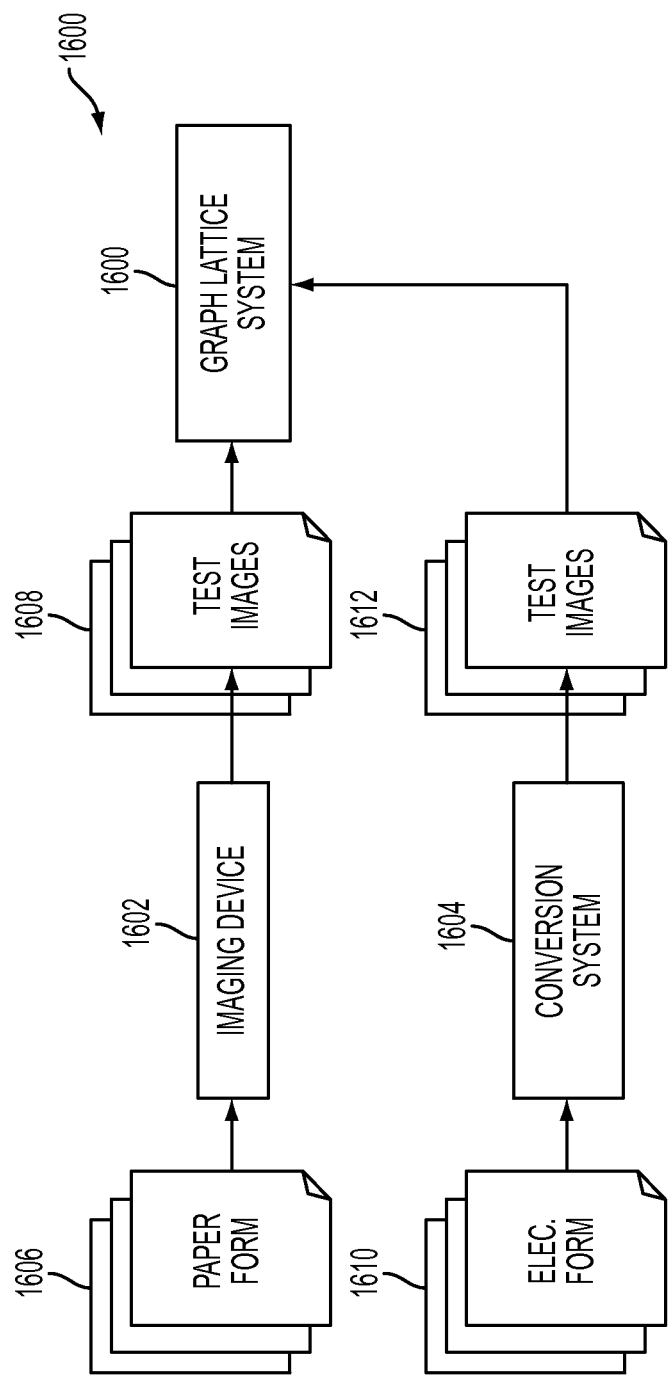
FIG. 16 illustrates a document vision system employing the graph lattice system of FIG. 15.

With reference to FIG. 16, a computer vision system 1600 using the graph lattice system 1500 of FIG. 15 is illustrated. The computer vision system 1600 may include an imaging device 1602 and/or a conversion system 1604, and the graph lattice system 1500 of FIG. 15. Notably, the computer vision system 1600 may only include one of the imaging device 1602 and the conversion system 1604.

The imaging device 1602 converts one or more paper forms 1606 into test images 1608. The imaging device 1602 may be one or more of a camera, a scanner, and the like. In certain embodiments, the imaging device 1602 may receive the paper forms 1606 via a conveyor path extending from a feed tray. However, other means of receiving the paper forms 1606 are equally amenable. For example, in certain embodiments, an operator of the computer vision system 1600 may feed the paper forms 1606 to the imaging device 1602. The conversion system 1604 converts one or more electronic forms 1610 into test images 1612. Electronic forms 1610 can be formatted in PDF, XML, Word, and the like. The electronic forms 1610 may be loaded from a magnetic or optical media or a network.

The graph lattice system 1500 processes the test images 1608, 1612 to perform one or more computer applications on the test images, such as image classification, image clustering, image retrieval, and repeated structure finding. However, typically, the graph lattice system 1500 processes the test images 1608, 1612 to classify the test images according to the algorithm 1300 of FIG. 13. Suitably, the graph lattice system 1500 receives the test images 1608, 1612 via a communications network, such as the Internet, a local area network, a wireless network, and the like. However, in other embodiments, the graph lattice system 1500 may receive the test images 1608, 1612 via a data bus, such as USB, Firewire, etc., a storage medium, such as a CD, a thumb drive, etc., and the like.

Once a test image is processed (e.g., classified), the corresponding form is processed as necessary. For example, paper forms may be routed via conveyer path(s) to a destination based upon their classification, and/or the electronic forms may be stored in a database and/or stored within a file system according to their classification.

6.0 Conclusion

Graph lattices and the algorithm applying the same facilitate efficiency, accuracy, and scalability in image classification. Efficiency derives from the algorithms for computing mappings to subgraphs that build from simple patterns to more complex patterns in a graph lattice. Accuracy derives from the redundancy in the graph lattice by the storage of a very large set of subgraphs in the graph lattice. Scalability derives from the algorithm disclosed to grow large graph lattices (that are still much smaller than the space of all subgraphs) that are tailored to observed data.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a digital processing unit, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for generating a graph lattice from exemplary images, said system comprising:
at least one processor programmed to:
receive exemplary data graphs of the exemplary images, wherein nodes of the exemplary data graphs are formed from primitives;
generate graph lattice nodes of size one from the primitives;
until a termination condition is met, repeatedly:
generate candidate graph lattice nodes from accepted graph lattice nodes, including the graph lattice nodes of size one and promoted graph lattice nodes, and the exemplary data graphs;
select one or more candidate graph lattice nodes, the selected candidate graph lattice nodes preferentially discriminating exemplary data graphs which are less discriminable than other exemplary data graphs using the accepted graph lattice nodes, wherein the selection of the one or more candidate graph lattice nodes includes a scoring operation where a high score indicates that a particular exemplary data graph is mapped to by many subgraphs of accepted graph lattice nodes that are not mapped to many other exemplary data graphs, indicating there are many discriminating subgraph features for the particular exemplary data graph, and a low score indicates the particular exemplary data graph is not mapped to by unique or highly discriminative features, and is more confusable with other exemplary data graphs, wherein each graph lattice node, including the accepted graph lattice nodes and the candidate graph lattice nodes, includes a subgraph, a vote weight, and at least one mapping of the subgraph to the exemplary data graphs, and wherein the scoring operation includes:
scoring each candidate graph lattice node according to a scoring function, the scoring function including a ratio, wherein a numerator of the ratio is based on the vote weight of the candidate graph lattice node, and wherein a denominator of the ratio is a summation of vote weights of accepted graph lattice nodes mapping to exemplary data graphs the candidate graph lattice node maps to; and,
the selection of the one or more candidate graph lattice nodes further includes selecting most highly scored candidate graph lattice nodes according to selection criteria; and,
promote the selected graph lattice nodes to accepted status;
wherein the graph lattice is formed from the accepted graph lattice nodes and relations between the accepted graph lattice nodes.

2. The system according to claim 1, wherein the primitives include junction types of rectilinear line art.

3. The system according to claim 1, wherein the termination condition is at least one of:
the number of accepted graph lattice nodes at a level exceeds a predetermined threshold;
the number of accepted graph lattice nodes exceeds a predetermined threshold; and,
promotion of all of the candidate graph lattice nodes.

4. The system according to claim 1, wherein nodes of size 1 of the graph lattice correspond to the primitives and nodes of size i>1 of the graph lattice each include a subgraph comprised of a subgraph of a node of size i−1 and one of the primitives.

5. The system according to claim 1, wherein the vote weight is 1/M, wherein M is the number of exemplary data graphs the subgraph maps to.

6. The system according to claim 1, wherein the vote weight is 1/M, wherein M is the number of exemplary data graphs the subgraph maps to.

7. The system according to claim 1, wherein the numerator of the ratio is zero in response to the candidate graph lattice node mapping to less than a predetermined number of exemplary data graphs, and the numerator is the vote weight of the candidate graph lattice node otherwise.

8. The system according to claim 1, wherein the selection criteria is at least one of:
select candidate graph lattice nodes with scores exceeding a predetermined threshold;
select candidate graph lattice nodes with scores falling within a top predetermined percentile; and,
select a predetermined number of the most highly scored candidate graph lattice nodes.

9. The system according to claim 1, wherein the processor is further programmed to:
receive a test data graph of a test image, wherein nodes of the test data graph are formed from the primitives, and wherein the exemplary images correspond to classes, including a class of the test image;
map the subgraphs of the accepted graph lattice nodes to the test data graph;
compare mappings between the graph lattice and the exemplary data graphs with mappings between the graph lattice and the test data graph to determine, for each of the exemplary data graphs, a weighted vote of similarity between the exemplary data graph and the test data graph, the weighted vote based on the vote weights of the accepted graph lattice nodes; and,
determine the class of the test image from the weighted votes, the class of the test image being the class of the exemplary data graph with the highest weighted vote.

10. A method for generating a graph lattice from exemplary images, said method comprising:
receive by at least one processor exemplary data graphs of the exemplary images, wherein nodes of the exemplary data graphs are formed from primitives;
generate by the at least one processor graph lattice nodes of size one from the primitives;
until a termination condition is met and by the at least one processor, repeatedly: generate candidate graph lattice nodes from accepted graph lattice nodes, including the graph lattice nodes of size one and promoted graph lattice nodes, and the exemplary data graphs;
select one or more candidate graph lattice nodes, the selected candidate graph lattice nodes preferentially discriminating exemplary data graphs which are less discriminable than other exemplary data graphs using the accepted graph lattice nodes, wherein the selection of the one or more candidate graph lattice nodes includes a scoring operation where a high score indicates that a particular exemplary data graph is mapped to by many subgraphs of accepted graph lattice nodes that are not mapped to many other exemplary data graphs, indicating there are many discriminating subgraph features for the particular exemplary data graph, and a low score indicates the particular exemplary data graph is not mapped to by unique or highly discriminative features, and is more confusable with other exemplary data graphs, wherein each graph lattice node, including the accepted graph lattice nodes and the candidate graph lattice nodes, includes a subgraph, a vote weight, and at least one mapping of the subgraph to the exemplary data graphs, and wherein the scoring operation includes:

scoring each candidate graph lattice node according to a scoring function, the scoring function including a ratio, wherein a numerator of the ratio is based on the vote weight of the candidate graph lattice node, and wherein a denominator of the ratio is a summation of vote weights of accepted graph lattice nodes mapping to exemplary data graphs the candidate graph lattice node maps to; and, the selection of the one or more candidate graph lattice nodes further includes the selection of most highly scored candidate graph lattice nodes according to selection criteria; and, promote the selected graph lattice nodes to accepted status;

wherein the graph lattice is formed from the accepted graph lattice nodes and relations between the accepted graph lattice nodes.

11. The method according to claim 8, wherein the primitives include junction types of rectilinear line art.

12. The method according to claim 10, wherein the termination condition is at least one of:
the number of accepted graph lattice nodes at a level exceeds a predetermined threshold;
the number of accepted graph lattice nodes exceeds a predetermined threshold; and,
promotion of all of the candidate graph lattice nodes.

13. The method according to claim 10, wherein the vote weight is 1/M, wherein M is the number of exemplary data graphs the subgraph maps to.

14. The method according to claim 10, wherein the numerator of the ratio is zero in response to the candidate graph lattice node mapping to less than a predetermined number of exemplary data graphs, and the numerator is the vote weight of the candidate graph lattice node otherwise.

15. The method according to claim 10, wherein the selection criteria is at least one of:
select candidate graph lattice nodes with scores exceeding a predetermined threshold;
select candidate graph lattice nodes with scores falling within a top predetermined percentile; and,
select a predetermined number of the most highly scored candidate graph lattice nodes.

16. The system according to claim 10, wherein each graph lattice node, including the accepted graph lattice nodes and the candidate graph lattice nodes, includes a subgraph, a vote weight, and at least one mapping of the subgraph to the exemplary data graphs, and wherein the processor is further programmed to:

receive a test data graph of a test image, wherein nodes of the test data graph are formed from the primitives, and wherein the exemplary images correspond to classes, including a class of the test image;

map the subgraphs of the accepted graph lattice nodes to the test data graph;

compare mappings between the graph lattice and the exemplary data graphs with mappings between the graph lattice and the test data graph to determine, for each of the exemplary data graphs, a weighted vote of similarity between the exemplary data graph and the test data graph, the weighted vote based on the vote weights of the accepted graph lattice nodes; and, determine the class of the test image from the weighted votes, the class of the test image being the class of the exemplary data graph with the highest weighted vote.

17. A system for generating a graph lattice from exemplary images, said system comprising:

at least one processor programmed to:
receive exemplary data graphs of the exemplary images, wherein nodes of the exemplary data graphs are formed from primitives;
generate graph lattice nodes of size one from the primitives;
until a termination condition is met, repeatedly:
generate candidate graph lattice nodes from accepted graph lattice nodes, including the graph lattice nodes of size one and promoted graph lattice nodes, and the exemplary data graphs, wherein each graph lattice node, including the accepted graph lattice nodes and the candidate graph lattice nodes, includes a subgraph, a vote weight, and at least one mapping of the subgraph to the exemplary data graphs;
score each candidate graph lattice node according to a scoring function, the scoring function including a ratio, wherein a numerator of the ratio is based on the vote weight of the candidate graph lattice node, and wherein a denominator of the ratio is a summation of vote weights of accepted graph lattice nodes mapping to exemplary data graphs the candidate graph lattice node maps to;
select most highly scored candidate graph lattice nodes according to selection criteria; and,
promote the selected graph lattice nodes to accepted status;
wherein the graph lattice is formed from the accepted graph lattice nodes and relations between the accepted graph lattice nodes.

* * * * *